United States Patent
Brown et al.

(10) Patent No.: US 10,785,326 B2
(45) Date of Patent: Sep. 22, 2020

(54) TARGETED ELECTRONIC AND NETWORKED CONTENT DELIVERY

(71) Applicant: Acoustic, L.P., New York, NY (US)

(72) Inventors: Bryan Reid Brown, Marietta, GA (US); Scott H Mitchell, Smyrna, GA (US); Jason Burke Brett, Marietta, GA (US)

(73) Assignee: Acoustic, L.P., New York, NY (US)

( * ) Notice: Subject to any disclaimer, the term of this patent is extended or adjusted under 35 U.S.C. 154(b) by 773 days.

(21) Appl. No.: 14/533,038

(22) Filed: Nov. 4, 2014

(65) Prior Publication Data

US 2015/0127739 A1    May 7, 2015

Related U.S. Application Data

(60) Provisional application No. 61/899,758, filed on Nov. 4, 2013.

(51) Int. Cl.
*H04L 29/08* (2006.01)

(52) U.S. Cl.
CPC .............. *H04L 67/22* (2013.01); *H04L 67/02* (2013.01); *H04L 67/20* (2013.01); *H04L 67/306* (2013.01)

(58) Field of Classification Search
CPC .............. G06Q 30/02; G06Q 30/0242; G06Q 30/0243; G06Q 30/0256; G06Q 30/0269; G06Q 30/0267; G06Q 30/0251; G06Q 30/0241; G06Q 30/0255; G06Q 30/0277; G06Q 30/0276; G06Q 50/01; G06Q 30/0271; G06Q 30/0643; G06Q 30/0254; G06Q 30/0239; G06Q 10/10; G06Q 30/016; G06Q 30/0201; G06F 17/30867; G06F 3/0482; G06F 17/30035; G06F 17/3089; G06F 17/30905; G06F 17/30761; H04L 67/306; H04L 67/02; H04L 63/0281; H04L 65/1063; H04L 51/12; H04L 67/22; H04L 67/26; H04W 4/206; H04W 4/21
See application file for complete search history.

(56) References Cited

U.S. PATENT DOCUMENTS

| | | | | |
|---|---|---|---|---|
| 8,930,204 | B1 * | 1/2015 | Igoe | G06Q 30/02 |
| | | | | 705/2 |
| 9,055,343 | B1 * | 6/2015 | Lewis | H04N 21/4826 |
| 2003/0041110 | A1 * | 2/2003 | Wenocur | G06Q 10/107 |
| | | | | 709/206 |
| 2008/0033811 | A1 * | 2/2008 | Brown | G06Q 30/02 |
| | | | | 705/14.66 |

(Continued)

*Primary Examiner* — Jason D Recek
*Assistant Examiner* — Ranjan Pant
(74) *Attorney, Agent, or Firm* — Mauriel Kapouytian Woods LLP; Lana Akopyan; Michael Mauriel (57) ABSTRACT

Disclosed are various embodiments for a content module to identify targeted content to a user based on the user's prior interactions with a content providing entity over multiple forms of communication. Information about the user's interaction over the multiple forms of communication, such as, for example, duration of interaction and frequency of interaction, is received by the content module. The content module executes a set of content identification rules to identify the targeted content using the received information about the user's prior interactions. The identified targeted content is provided to the user's device for display on a user interface.

19 Claims, 7 Drawing Sheets

(56) References Cited

U.S. PATENT DOCUMENTS

| | | | |
|---|---|---|---|
| 2008/0098456 A1* | 4/2008 | Alward | G06F 21/316 726/1 |
| 2008/0214148 A1* | 9/2008 | Ramer | G06Q 30/02 455/414.1 |
| 2009/0240590 A1* | 9/2009 | Or | G06Q 30/02 705/14.58 |
| 2010/0235457 A1* | 9/2010 | Huynh | H04L 29/06 709/206 |
| 2011/0093329 A1* | 4/2011 | Bodor | G06Q 30/02 705/14.42 |
| 2011/0196734 A1* | 8/2011 | Anderson | G06Q 30/02 705/14.42 |
| 2011/0223944 A1* | 9/2011 | Gosselin | H04W 4/21 455/466 |
| 2011/0276396 A1* | 11/2011 | Rathod | H04L 12/18 705/14.49 |
| 2012/0203639 A1* | 8/2012 | Webster | G06Q 30/0269 705/14.66 |
| 2012/0204109 A1* | 8/2012 | Julia | G06Q 30/02 715/716 |
| 2013/0101970 A1* | 4/2013 | Mascarenhas | G09B 19/00 434/236 |
| 2013/0124333 A1* | 5/2013 | Doughty | G06Q 30/0269 705/14.66 |
| 2013/0136253 A1* | 5/2013 | Liberman Ben-Ami | H04M 3/5191 379/265.09 |
| 2013/0297425 A1* | 11/2013 | Wallaja | G06Q 20/4014 705/14.64 |
| 2014/0006556 A1* | 1/2014 | Shapiro | H04N 21/25891 709/217 |
| 2014/0019542 A1* | 1/2014 | Rao | H04L 67/306 709/204 |
| 2014/0032259 A1* | 1/2014 | LaFever | G06Q 30/0201 705/7.29 |
| 2014/0046777 A1* | 2/2014 | Markey | G06Q 30/0269 705/14.66 |
| 2014/0130076 A1* | 5/2014 | Moore | H04N 21/25883 725/19 |
| 2014/0257991 A1* | 9/2014 | Christensen | G06Q 30/0241 705/14.66 |
| 2015/0127565 A1* | 5/2015 | Chevalier | G06Q 10/00 705/319 |
| 2015/0128039 A1* | 5/2015 | Wieder | G06F 3/0481 715/716 |
| 2015/0350827 A1* | 12/2015 | Birch | H04W 8/04 455/456.1 |

* cited by examiner

TARGETED ELECTRONIC AND NETWORKED CONTENT DELIVERY

BACKGROUND

Commercial and non-commercial entities engage in campaigns to promote the sale of a variety of products and services, and/or elicit contributions. For example, retailers may distribute advertisements, fliers, mailings, electronic communications and/or other types of marketing materials to announce sales and promote sale of items. These types of campaigns can be more effective if they are targeted specifically for different users such that the campaign is personalized.

Users interact with the commercial and non-commercial entities using multiple forms of communication. Some are electronic over a network and others are not online, such as in person or through the mail. For example, users interact with entities by accessing web pages, sending email, and consuming content on a social media platform. Users also interact with entities by calling over a phone, faxing using a fax machine, and walking into a store front. It is desirable for commercial and non-commercial entities to provide targeted content specifically for certain users based on their interactions with the entity.

SUMMARY

In one embodiment, a method is provided. The method comprises receiving a request for content from a user device associated with a user having an identifier. The method also comprises executing a set of content identification rules to determine targeted content for the user based on the user's prior interaction with a content providing entity over two or more forms of communication, wherein each of the two or more forms of communication occurs electronically over a network and comprises a communication using one of a browser, an e-mail application, and a social media platform, and the prior interactions include a first interaction and a second interaction, wherein a form of communication for the first interaction differs from a form of communication for the second interaction. Additionally, the method comprises providing the targeted content to the user device for inclusion on a user interface to be rendered on a display associated with the user device.

Another aspect is a non-transitory computer-readable medium on which is encoded program code. The program code comprises code for providing executable code that engages with a cookie associated with a browser on a user device, the executable code configured to engage the cookie to identify information about a user's interaction with a content providing entity. The program code comprises code for receiving the information about the user's prior interaction with a content providing entity over two or more forms of communication, wherein each of the two or more forms of communication is electronic over a network and comprises a communication using one of a browser, an email application, and a social media platform, and the prior interactions include a first interaction and a second interaction, wherein a form of communication for the first interaction differs from a form of communication for the second interaction. The program code also comprises code for associating the information about the user's interaction over the two or more forms of communication together with an identifier. Additionally, the program code comprises code for identifying targeted content for the user based on the information about the user's prior interactions over the two or more forms of communication with the content providing entity.

In another embodiment, a system includes a content provider device and an interaction data device. The content provider device comprises a rules creation application for managing content identification rules and content. The rules creation application comprises logic for associating a set of content identification rules to the content. The rules creation application also comprises logic for publishing the set of content identification rules for identifying targeted content based on information about a user's prior interactions with the content provider device through two or more forms of communication. The interaction data device comprises a content module for identifying targeted content to provide to a user device. The content module comprises logic for receiving information about the user's prior interactions with the content provider device through two or more forms of communication, wherein each of the two or more forms of communication is electronic over a network, and the prior interactions include a first interaction and a second interaction, wherein a form of communication for the first interaction differs from a form of communication for the second interaction. The content module also comprises logic for receiving the published set of content identification rules from the content provider device. Additionally, the content module comprises logic for executing the published set of content identification rules to identify the targeted content based on the information about the user's prior interaction with the content provider device through the two or more forms of communication.

DETAILED DESCRIPTION

Disclosed are features that allow commercial and non-commercial entities to provide targeted content specifically for users based on the user's prior interactions with the entity over multiple forms of communication. For example, the user may interact with the content providing entity over forms of communication, such as through a web page, e-mail, a social media platform, postal mail, telephone, short message service (SMS), mobile push notifications, mobile applications, face-to-face meeting, a combination of these, or other forms of communication. Information related to a user's behavior during such interaction over each form of communication can be observed and recorded on an interaction data device. This information can be associated with an identifier for the user on an interaction data device. When the user accesses a web page associated with the content providing entity, the interaction data device identifies targeted electronic content to display on the web page based on the user's prior interactions with the content providing entity using multiple forms of communication.

As an example, the interaction data device receives and may also store information related to users' prior interactions with the content providing entity over multiple forms of communication. One or more protocols associated with each of the forms of communication may be configured to provide the desired interaction information to the interaction data device. For example, if the form of communication involves a browser, a cookie associated with the browser may identify a user communicating via the browser and observe the user's interaction. As another example, if the form of communication involves a telephone, a recorder can record the conversation. As a further example, if the form of communication involves e-mail or a social media platform, one or more automated scripts may parse or extract information in the communications, and so on. The interaction data device receives the information about the user's interaction with the content providing entity and relates the received information with a user identifier associated with a specific user. The interaction data device may also store information related to user interaction for multiple users according to the respective user's identifier.

The interaction data device can detect when a user accesses a web page associated with the content providing entity. For example, the user may provide the identifier while accessing the web page, such as the user's name, a username, and any other identifying information unique to the user. As another example, the interaction data device may detect the user identifier associated with the user when the user access the web page. For instance, the user may have provided identifying information during an earlier session with the web page. In response, the interaction data device executes a set of content identification rules received from the content providing entity to identify the targeted electronic content specifically for the user. These content identification rules are executed using information related to the user's previous interactions with the content providing entity over any and all forms of communication. Having identified the targeted electronic content, the interaction data device transmits the targeted electronic content to the user's device for display at a predefined location on the web page. The interaction data device may also transmit a modified web page to the user's device that includes the targeted electronic content.

Figure 1:
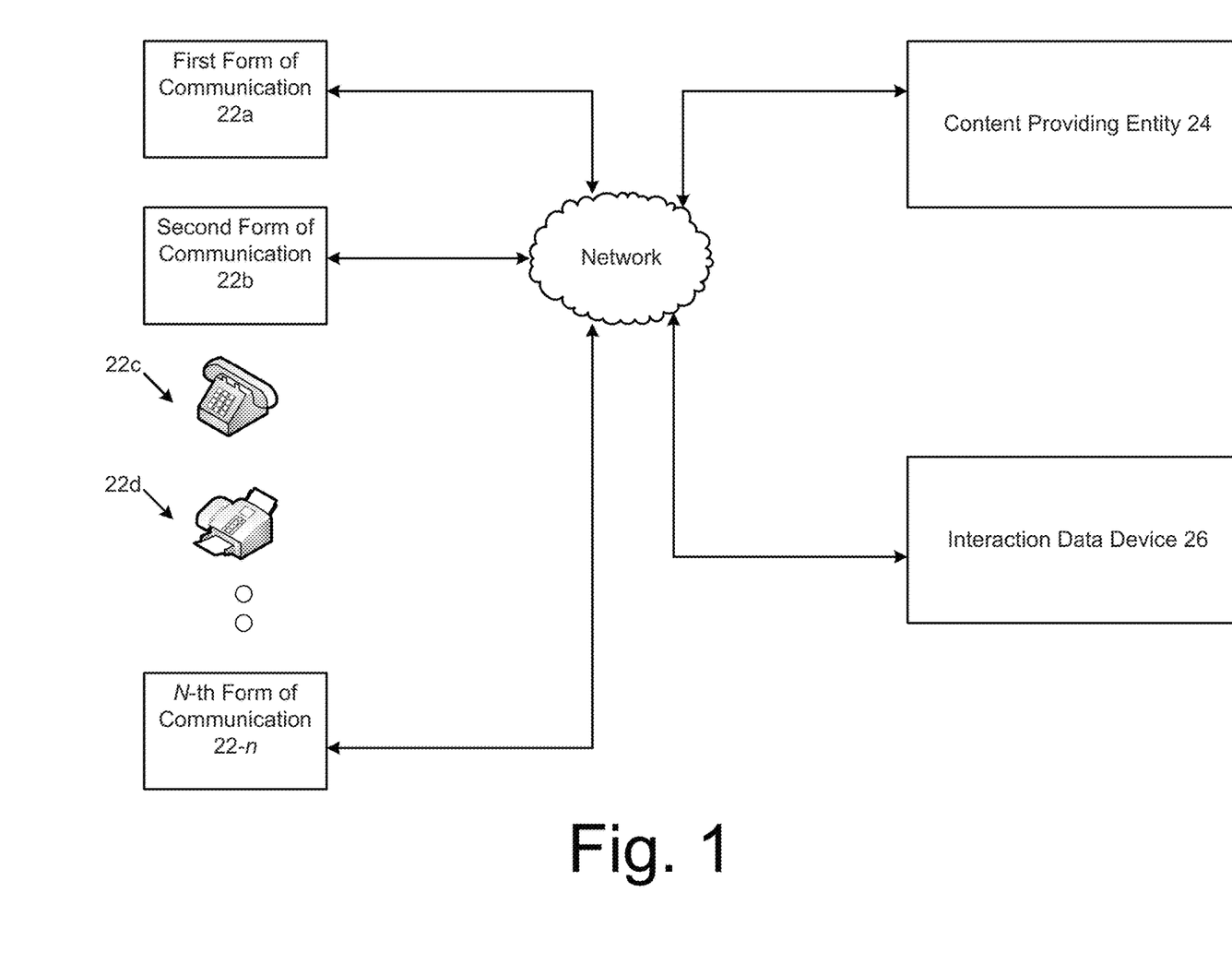
FIG. 1 is a block diagram of a networked environment for accessing a content providing entity over multiple forms of communication according to one embodiment of the present disclosure.

FIG. 1 illustrates multiple forms of communication 22, a content providing entity 24, and an interaction data device 26 according to one embodiment. Users can interact with the content providing entity 24 via one or more electronic forms of communication 22 over a network, such as a data network or a cellular network. For example, a first form of communication 22a may involve communication via a browser that renders a web page provided by the content providing entity 24 for the user to interact with. A second form of communication 22b may involve communication via a social media platform through which the user may interact with the content providing entity 24, A third form of communication 22c may involve communication via a telephone. A fourth form of communication 22d may involve communication via SMS. A fifth form of communication may involve communication via an email application, mobile applications, and so on. The user may interact with the content providing entity 24 over N different electronic forms of communication. Further, the user may interact with the content providing entity 24 over the N forms of communication 22 via any number of user devices.

The user may interact with the content providing entity 24 over other forms of communication that are not electronic. For example, non-electronic forms of communication may involve communication via a printed document such as postal mail. Another form of non-electronic communication may involve verbal communication such as a face-face conversation. For example, a user may interact with the content providing entity 24 non-electronically in person by visiting a storefront associated with the content providing entity 24, or having a face-face conversation with a representative of the content providing entity 24.

Regardless of whether the form of communication is electronic, information related to each instance of the user's interaction over any one of the forms of communication is observed by the content providing entity 24. For example, a cookie associated with a browser monitors information related to the user's activity while interacting with the web page provided by the entity 24, or a parser extracts information from a user's email to the entity 24, and so on. For a non-electronic form of communication, such as a face-face conversation, a representative of the content providing entity 24 may observe the user and enter information about the user's interaction, record the conversation with the user, and so on.

The information related to each instance of user interaction is stored on the interaction data device 26 for use in identifying the targeted electronic content. The interaction data device 26 stores the information related to each user's interaction with the content providing entity 24 over multiple forms of communication, whether electronic or not electronic, according to a user identifier associated with the respective user. The information is stored such that the interaction data device 26 maintains a single identity for each user that includes the information related to the respective user's interaction over all forms of communication.

To identify the targeted electronic content, the content providing entity 24 provides content identification rules that are executed by the interaction data device 26 to identify the targeted electronic content to be provided to each particular user. The interaction data device 26 can execute the rules based on the stored information related to the user's prior interactions with the content providing entity 24 over multiple forms of communication 22, both electronic and non-electronic. The targeted electronic content may include recommendations for purchases, reminders for appointments and deadlines, product promotional information, a combination of these or other messages that enhance the user's experience with the content providing entity. Having identified the targeted content, the interaction data device 26 can provide the identified targeted content to the user's device to be rendered at a predefined location within the web page or can provide a modified web page that includes the identified targeted content to the user's device.

Figure 2:
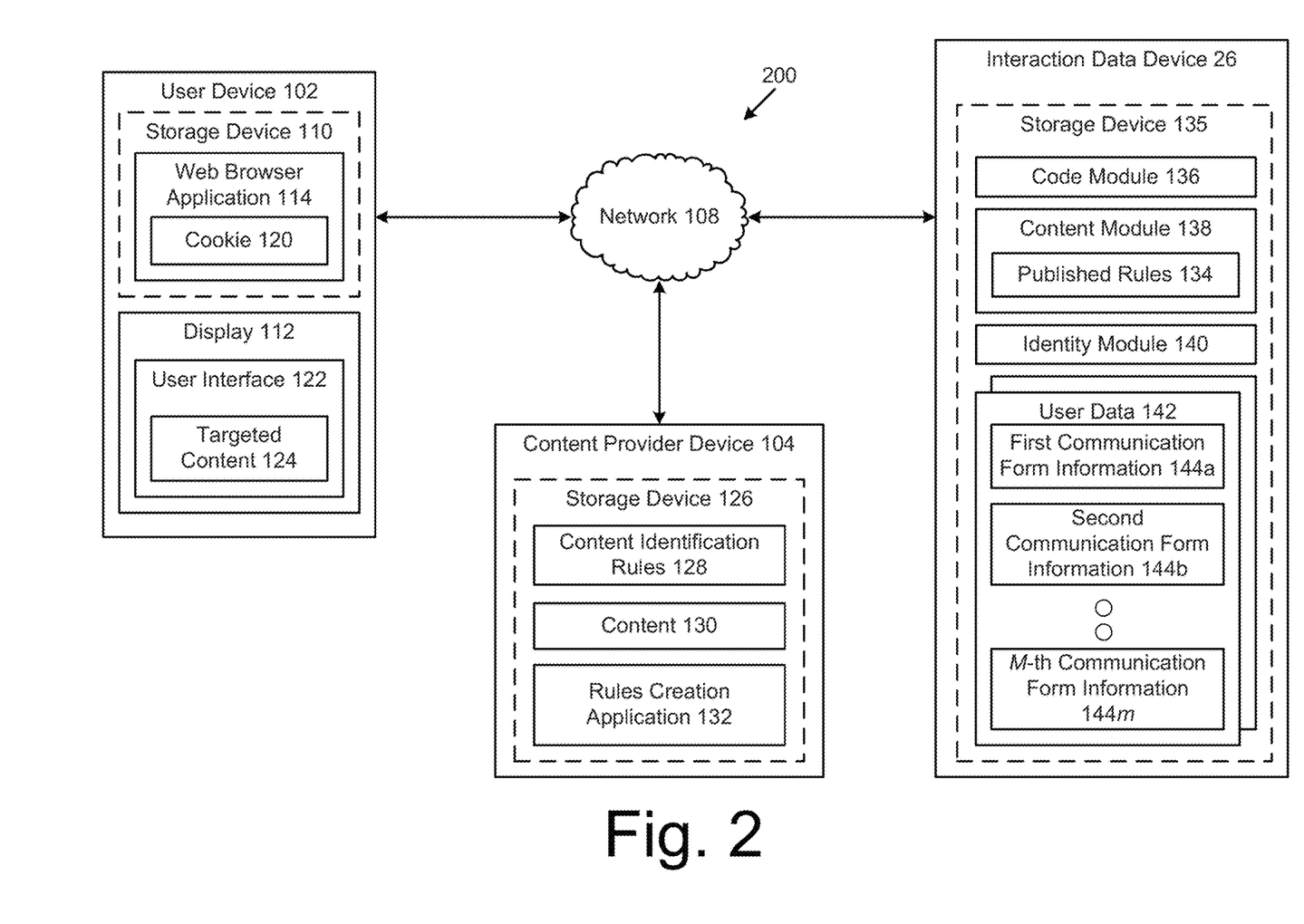
FIG. 2 is a block diagram of a networked environment for providing targeted content to a user interacting over multiple forms of communication according to one embodiment of the present disclosure.

FIG. 2 illustrates an example of a networked environment 200 for delivering targeted electronic content to a user device identified from information related to a user's prior interactions with a content providing entity over multiple forms of communication. The networked environment 200 includes a user device 102, a content provider device 104, and the interaction data device 26 connected via a network 108. The network 108 can include the internet, an intranet, wide area network (WAN), local area network (LAN), virtual private network (VPN), a cellular network, a public switched telephone network (PSTN), or any suitable communications network that allows one or more user devices 102, the content provider device 104, and the interaction data device 26 to communicate. Network 108 may include one or more networks.

A user can access a web page provided by the content provider device 104 via the user device 102. The content provider device 104 is a physical representation of the content providing entity 24. The user may interact with the content provider device 104 over multiple forms of electronic communication 22, such as the web page, an e-mail application, telephone, and so on.

The user device 102 includes a storage device 110 and a display 112. The storage device 110 includes a web browser application 114 and may also include one or more other applications that enable electronic communication over the network 108. The web browser application 114 includes a cookie 120, such as a HTTP cookie, that identifies the user of the device 102 and observes information related to the user's interaction with the web page. For example, the information observed by the cookie 120 may be related to a number of web page visits, a frequency of web page visits, times of the web page visits, portions of the web page visited, and may be other information related to the user's interaction with the web page. One or more other applications that enable electronic communication over the network 108 can also have a component for such information. The information related to the user's interaction with the web page may be observed in other ways.

The web browser application 114 renders a user interface 122 on the display 112 associated with the user device 102. A portion of the user interface 122 may include targeted content 124 identified for the user based on the user's prior interactions with the content providing entity 24 over the multiple forms of communication 22. For example, the targeted content 124 may be identified by the interaction data device 26 based on rules published by the content providing entity 24 and the user's prior electronic and non-electronic interactions with the content providing entity 24.

The content provider device 104 is a representation of the content providing entity 24 and includes a storage device 126 which contains the content identification rules 128, a collection of content 130, a rules creation application 132, and other data. The storage device 126 may include one or more other applications or services that facilitate other functionality of the content providing entity 24. The content 130 may include any type of electronic content such as item recommendations, reminders for events, coupons for purchasing items, purchase incentives, white papers, articles, videos, a combination of these or any other type of message that enhances the user's experience while interacting with the electronic content provider. The content 130 may also include messages, alerts, warnings, notifications and other types of statements. For example, the content 130 may include calendar related statements such as reminders to purchase an expiring product, item, subscription, prescription and other calendar reminders. More examples of the content 130 include time related statements, such as a notification that an event is approaching, a process is incomplete or overdue, and other time related statements. As a specific example, the content 130 may be a notification that a scheduled appointment or a deadline to register for an event is approaching. Additional examples of the content 130 include statements that solicit feedback from the user. For instance, the content 130 may be a request for the user to provide identifying information such as a telephone number or email address, comments on services, and other types of feedback. The content 130 may also include statements that update the user on news and achievements. For example, the content 130 may include a notification congratulating the user for achieving a level in a rewards program, congratulating the user for enrolling in the rewards program, notifying the user that a new rewards program is available, and other types of updates on news and achievements.

The content identification rules 128 may be instructions defined by the content providing entity 24 for identifying content 130 targeted for each user based on the respective user's behavior while interacting with the content providing entity 24. For example, the content identification rules 128 may specify which content 130 to provide when a user's interaction corresponds to a pattern of user interaction behavior. As a specific example, the content identification rules 128 indicates that a particular content 130 be provided as the targeted content 124 if the user visits a certain web page a predetermined number of times within a defined period of time. As another specific example, the rules 128 may indicate that another particular content 130 be provided as the targeted content 124 if the user searches for a specific product a number of times on the web page or calls a telephone number associated with the content providing entity 24 to inquire about the same specific product. Other rules 128 for identifying content targeted for each user based on the user's behavior while interacting with the content providing entity 24 can relate to duration of the interaction, frequency of the interaction, subject matter of the interaction, and other patterns of behavior exhibited by users while interacting with the content providing entity 24.

Rules creation application 132 is executed to create and manage the content identification rules 128. In one embodiment, the rules creation application 132 may receive the content identification rules 128 from the content providing entity 24. The content identification rules 128 may be based on prior user interaction data and information about the user. For example, the content identification rules 128 may indicate to identify certain content 130 based on the user's location, one or more of the user's previous purchases from the content providing entity, an amount of time the user spends interacting with the content providing entity, the types of items the user observes while interacting with the content providing entity, a combination of one or more of these rules, and other rules based on the user's prior interactions and the information about the user. As a specific example, the content identification rules 128 may indicate to provide certain content 130 when the user interacts with the content provider from a certain geographic area, the user has not purchased a product from the content provider within a certain amount of time, the user recently interacted with the content provider at a certain time of day, and the user is a loyalty rewards member with the content provider.

As an another example, a user may have previously interacted with the content providing entity 24 electronically, such as via a communication involving a browser. Information related to this interaction involving the browser is stored as a first communication form information 144a in the user data 142 entry for the user. The same user may have also previously visited a store front associated with the content providing entity 24 and purchased prescription medication. Information related to the interaction at the store front is stored as a second communication information 144*b* in the same user data 142 entry for the user. For instance, the information related to the interaction that is stored may include the fact that the user purchased prescription medication, the identity of medication, the duration of the prescription, and other information about the user's interaction at the store front. The user may subsequently interact electronically with the content providing entity 24, such as a communication involving a browser, after a period of time. On the subsequent interaction, the content identification rules 128 may indicate to provide content 130 targeted to the user that includes a reminder to renew the prescription if the user's prescription medication purchased during the previous interaction at the store front is nearing expiration.

The content provider may create, revise, or modify the content identification rules 128 and the content 130 associated with a set of content identification rules 128 via an interface provided by the rules creation application 132, and publish a version of the rules, i.e. published rules 134, for use by the interaction data device 26 to identify the targeted content 124. In one embodiment, the rules creation application 132 may be invoked at any time to dynamically adjust and modify the content identification rules 128 and publish the modified content identification rules 128 as the published rules 134 for execution by the interaction data device 26.

As an example, the rules creation application 132 may be used to modify content 130, such as notifications, such that the modified content 130 is presented to the user as the targeted content 124 when a set of content identification rules 128 are satisfied. Using the above example about prescription medication, the content 130 may be a notification to renew prescription medication and may read "Looks like you need to renew your prescription." The rules creation application 132 may be used to modify the content 130 to add the user's name, the identity of the medication, and other information related to the prescription such that when the content 130 is targeted to a particular user when presented as the targeted content 124. For instance, the targeted content 124 may read "Mark—looks like you need to renew your prescription for Zyrtec®." The content 130 may be further modified to include other information such as a hyperlink to renew the prescription, contact the user's pharmacist or doctor, cancel the prescription, and other perform other functions related to the prescription medication.

Further, the rules creation application 132 may be used to define the set of content identification rules 128 that define the circumstances for presenting the content 130 to the user. Returning to the above prescription medication example, the content identification rules 128 for the modified content may include a time based rule for comparing the duration of the prescription with the amount of time elapsed since the user purchased the prescription medication at the store front. The modified content and the rules are then published to the interaction data device 26 for execution.

The interaction data device 26 represents a computing environment that includes one or more devices capable of receiving the published rules 134 defined by the content providing entity 24, and identifying the targeted content 124 to provide to the user device 102 according to the published rules 134. The interaction data device 26 includes a storage device 135 that comprises a code module 136, a content module 138, an identity module 140, or other modules. Additionally, the storage device 135 includes one or more entries for user data 142.

The code module 136 generates code that, for example, engages with the cookie 120 on the user device 102 or otherwise engages with the user device 102 via an application programming interface (API), specifies the targeted content 124 to be rendered on the display 112 and further, specifies a location within the user interface 122 to render the targeted content 124. The code module 136 may generate a modified web page or other user interface that includes the targeted content 124 to be provided to the user device 102. The code generated by the content module 136 may be JavaScript® code or code in another computing language. In one embodiment, the code module 136 engages with the user device 102 with the API to provide the targeted content 124. For example, the user device 102 may provide, via an API call, user information to the interaction data device 26 which is processed to return the targeted content 124. The code module 136 may return the targeted content 124 electronically to the user device 102.

In one embodiment, the user may interact with the content providing entity via a telephone. For example, the user may interact with the entity by calling a toll free number to reach a call center and speak with representative of the entity. The call center interface or the representative may receive the user's information, such as the user's identifying information or interaction information, and provide it to the code module 136. In response, the code module 136 provides the targeted content 124 for the calling user and provides the targeted content 124 to the call center interface or the representative. The representative may then include the targeted content 124 in the communication with the user to personalize the user's call.

The content module 138 identifies the targeted content 124 by executing the published rules 134 received from the content provider device 104. For example, the content module 138 executes the published rules 134 to identify a pattern of user interaction behavior for the user based the user's prior interactions with the content providing entity 24 over the multiple forms of communication.

The storage device 135 includes user data 142 entries for each user that interacts with the content providing entity 24. Each user data 142 entry includes information related to the user's prior interactions with the content providing entity 24 over the multiple forms of communication, whether electronic or non-electronic. For example, first communication form information 144*a* includes information related to the user's prior interactions with the content providing entity 24 via a first form of communication 22*a*. Similarly, second communication form information 144*b* includes information related to the user's prior interactions with the content providing entity 24 via a second form of communication 22*b*, and so on. Each user data 142 includes the information for the respective user's prior interactions with the electronic content on M different forms of communication, both electronic and non-electronic.

The storage device 135 may include an identity module 140 to manage the entries of user data 142. For example, the identity module 140 may determine whether a single user has multiple entries of user data 142 and link the multiple entries to create a single identity that describes the user's behavior on prior interactions with the content providing entity 24. Multiple entries for a particular user may be created when the user anonymously interacts with the content providing entity 24 over multiple forms of communication 22. For example, a user may interact with the content providing entity 24 over a first form of communication 22*a*, such as a web page, resulting in data stored as the first communication form information 144*a* in a first user data entry. The same user may also anonymously interact with the content over a second form of communication 22b, such as an email application, resulting in data stored as another first communication form information 144a but for a second user data entry. The identity module 140 manages the first user data entry and the second user data entry separately as associated with two separate users until the identify module receives or detects some identifying information on a subsequent interaction that may be used to link the first user data entry and the second user data entry. For example, the user may provide identification information such as a name or address, or provide some other identifying information such as details on a recent purchase that may be used by the identity module 140 to link the second user data entry with the first user data entry. The identity module 140 manages the user data 142 to maintain a single identity per user where applicable.

Figure 3:
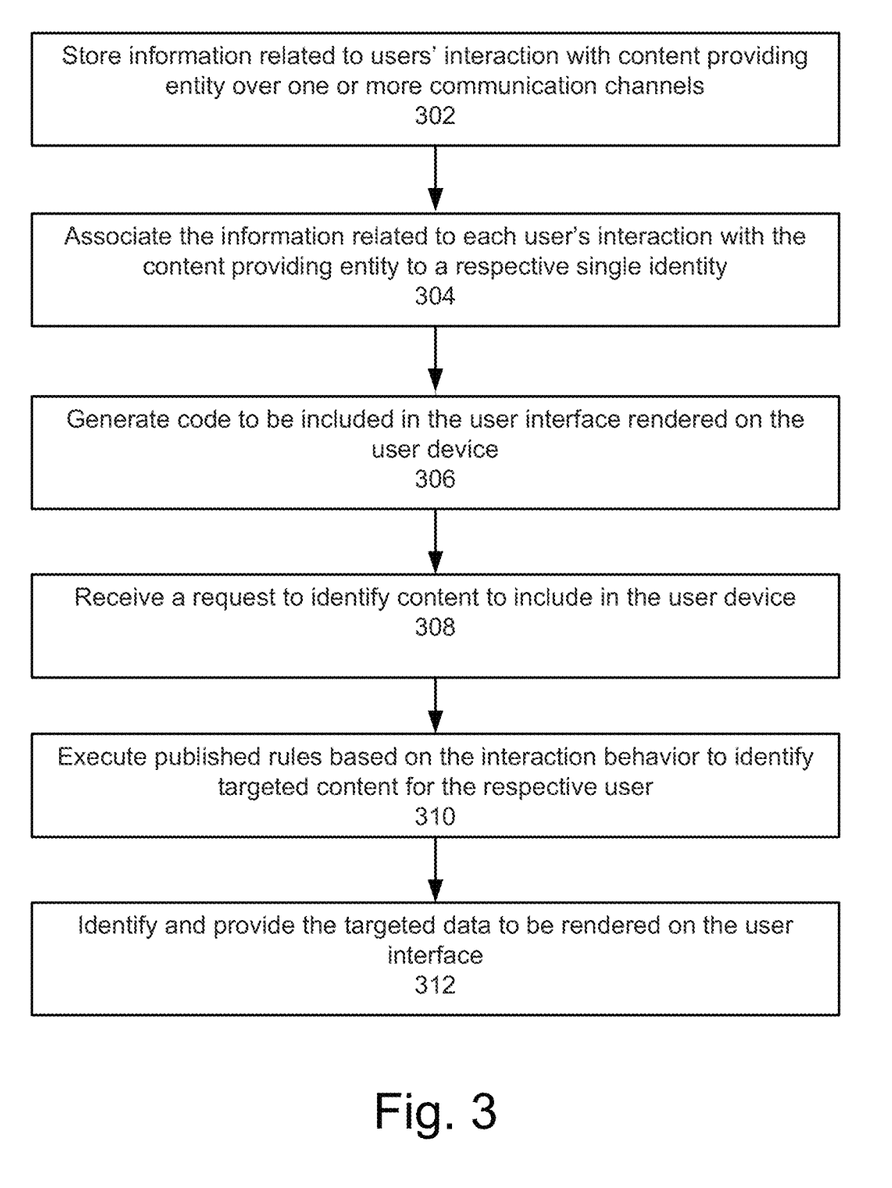
FIG. 3 is a flowchart illustrating an example of functionality implemented on the interaction data device in the networked environment of FIG. 2 according to one embodiment of the present disclosure.

FIG. 3 illustrates an example of method of operation of the interaction data device 26. In block 302, the interaction data device 26 stores information related to a user's prior interactions with the content providing entity 24. For example, the interaction data device 26 stores the information related to each user's prior interactions with the content providing entity 24 over multiple forms of communication, including electronic and non-electronic. For electronic forms of communication, the interaction data device 26 may receive the information about the user's interaction from one or more protocols associated with the respective form of communication. For non-electronic forms of communication, the interaction device 26 may receive the information about the user's interaction after it was entered manually.

In block 304, the identity module 140 of the interaction data device 26 associates all the information related to each user's interaction with the content providing entity 24 that has been separately stored with a respective single identity. For example, the identity module 140 may determine that several entries of user data 142 are stored for a single user. The user may have anonymously interacted with the content providing entity 24 causing interaction data device 26 to store information about that anonymous interaction as a separate user data 142 entry. The identity module 140 determines that the user who previously interacted with the content providing entity 24 anonymously is the same as a user with a previously stored user data 142 entry. For example, the identity module 142 may compare the communication form information in the user data 142 entries and identify similarities in user interaction, or other similarities unique to the user. In response, the identity module 140 links the multiple entries of user data 142 to form a single identity that includes all of the communication form information for the user. The identity module 140 may associate the multiple entries when identifying information related to the user data 142 is detected or received.

In block 306, the code module 136 generates code that is transmitted to the user device 102 to be executed in conjunction with the rendering of the user interface 122. The code may be a JavaScript code, or code in another computing language, configured to create and engage with the cookie 120 associated with the web browser application 114 to identify the user for observing the user's interaction with the content providing entity 24. Information related to the user's interaction with the content providing entity 24 may be transmitted to the interaction data device 26 for storage. Additionally, the code may generate a modified web page that includes the targeted content 124 to be displayed on the user interface 122 or may provide a location within the user interface 122 to display the targeted content 124.

In block 308, the interaction data device 26 receives a request to identify content 124 to be displayed for the user accessing, via the user device 102, a web page provided by the content providing entity 24. For example, the web browser application 114 on the user device 102 may render a user interface 122 and, consequently, execute the code that engages with the cookie 120. The code may then cause the user device 102 to transmit the request to the interaction data device 26 to identify content 124 to be displayed for the user on the web page.

In block 310, the content module 138 of the interaction data device 26 executes the published rules 134 to identify targeted content based on all of the available communication form information 144 associated with the respective user. For example, the content module 138 identifies the communication form information 144 from the user data 142 associated with the respective user and executes the published rules 134 upon receiving the request for content from the user device 102. The content module 138 executes the published rules 134 using all of the information related to the user's prior interactions with the content providing entity 24 over multiple forms of communication available in the content form information 144. In one embodiment, the content module 138 executes the published rules 134 upon each instance of receiving a request for content such that the targeted content 124 is identified upon each instance of a user access to the web page. The targeted content 124 may change upon each instance of receiving a request for content to account for a user's new interactions with the content providing entity 24 since the previous instance.

In block 312, the content module 138 identifies the targeted content 124 that satisfies the published rules 134. The identified targeted content 124 is provided to the user device for rendering on the display. The rendered targeted content 124 enhances the user's experience with the electronic content provider.

Figure 4:
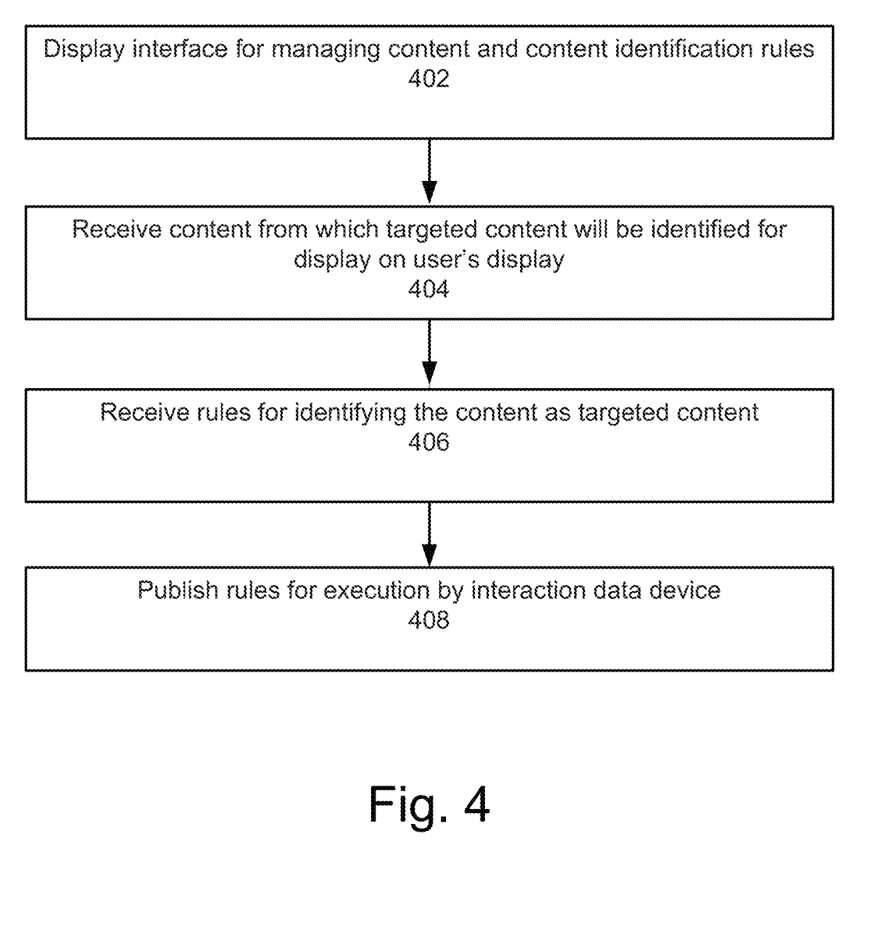
FIG. 4 is a flowchart illustrating an example of functionality implemented on the content provider device in the networked environment of FIG. 2 according to the embodiment of the present disclosure.

FIG. 4 illustrates an example of a method of operation of the content provider device 104 which is representative of the content providing entity 24. In block 402, the content provider device 104 displays, on a display device associated with the content provider device 104, an interface for managing content 130 and the content identification rules 128. For example, the rules creation application 132 can render an interface for the content providing entity 24 to add new content 130, modify existing content 130, and remove old content 130. The interface can also allow the content providing entity 24 to associate new or modify existing content identification rules 128 for the new and existing content 130.

In block 404, the content provider device 104 receives new content 130 which will be used by the interaction data device 26 for identifying targeted content 124 to be displayed on the user's display 112. The content 130 may include event reminders, promotional content, purchasing incentives, and other types of content to enhance the user's experience while interacting with the content providing entity 24. The content provider device 104 also receives identification of existing content 130 that is to be removed by the content provider device 104.

In block 406, the content provider device 104 receives content identification rules 128 to associate with the content 130 for use by the interaction data device 26 for identifying the targeted content 124 to be displayed on the user's display 112. The content identification rules 128 associated with the content 130 specify when to identify the content 130 as targeted content 124 for display on the user's display 112. The content provider device 104 also receives identification of existing content identification rules 128 that are to be removed and modified. For example, the content identification rules 128 can be modified to change association with other content 130 and change the subject matter of rules such that identification of the content 130 as the targeted content 124 is affected.

In block 408, the content provider device 104 publishes the content identification rules 128 for the interaction data device 26 to execute as published rules 134. The interaction data device 26 executes the published rules 134 to identify the targeted content 124 for each user based on the user's interaction with the content providing entity 24.

Figure 5:
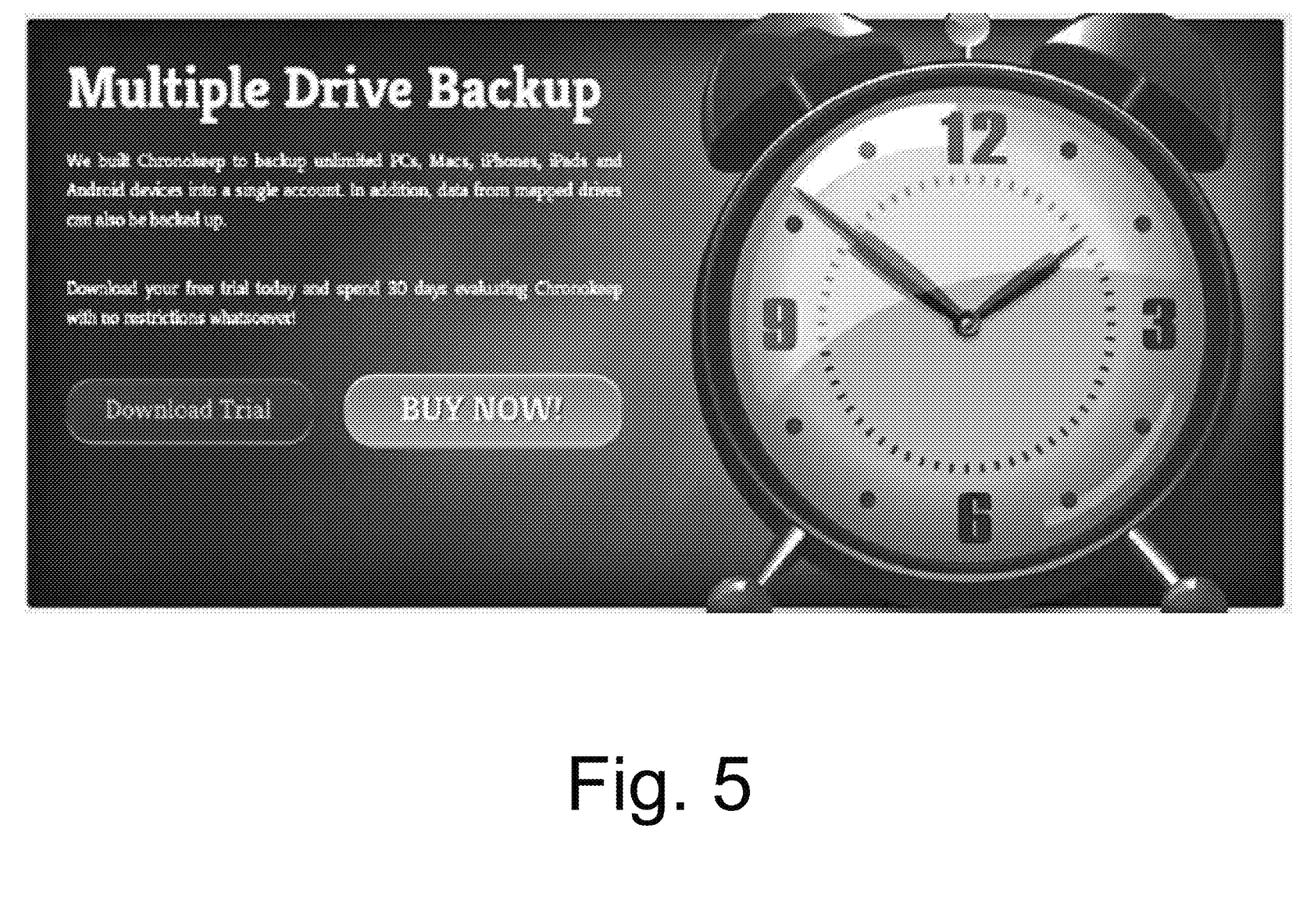
FIGS. 5 and 6 are screen shots of a user interface rendered on a user device in the networked environment of FIG. 2 according to one embodiment of the present disclosure.

FIG. 5 illustrates a web page rendered on a display 112 associated with the user device 102. The web page is rendered by a web browser application 114 and includes content provided by the content providing entity 24. In this example, the content providing entity 24 provides data backup software. The identity of the user is unknown and thus the web page may not include any targeted content 124. The user's interaction with the web page is observed and recorded on the interaction data device 26 via the cookie 120 as discussed. The user may anonymously enroll in a free trial of the software via a user device having a device identifier, which is stored in the user data 142 entry for the user, along with the information about the user's interaction.

Figure 6:
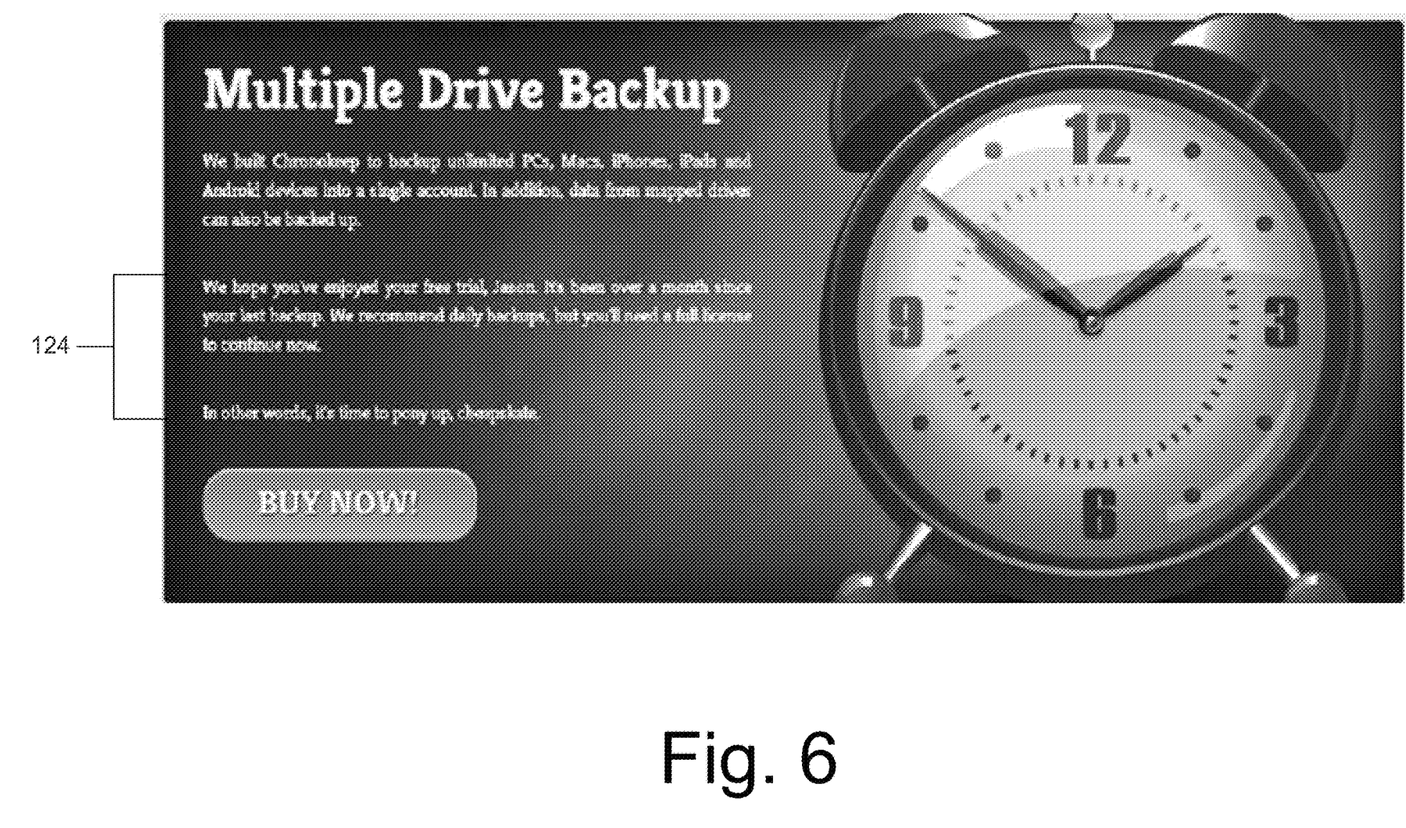

FIG. 6 illustrates a web page rendered on the display of the user device 102 that includes targeted content 124. As illustrated here, the targeted content 124 can be a personalized message displayed to the user in a style and format that conforms to the other content on the webpage. The identity module 140 may determine the identity of the user and thus the content module 138 may execute the published rules 134 to identify the targeted content 124 for the user. The targeted content 124 can be determined from the user's prior interactions with the content providing entity 24 over multiple forms of communication. For example, the user's prior interactions may be stored as communication form information 144 accessible to the content module 138.

In this example, the user interacts electronically using the same form of communication 22 (e.g., a browser) with the entity providing the data backup software. In the user's previous interaction, the user anonymously enrolled in the free trial of the software. Since that previous interaction, the user may have interacted with the entity over other forms of communication. For example, the user may have interacted with the entity electronically, using the same user device having the device identifier, over a social media platform where the user revealed his name, that he had enrolled in a free trial of the software and the date of the enrollment. The interaction data device 26 stores the information from the user's interaction over the social media platform as new user data 142 entry and determines whether this information corresponds with any previously stored information in other user data 142 entries to link the user data 142 entries together. For example, the identity module 140 may identify similarities between the user data 142 entries such as cookie identifiers, social media handles, mobile application identifiers, mobile phone numbers, email addresses, rewards numbers, device identifiers, and other unique identification information. Upon linking the user data 142 entries together, the identity of the anonymous user is known and targeted content 124 for that user may be identified when the user next interacts with the content providing entity 24 over the browser.

Figure 7:
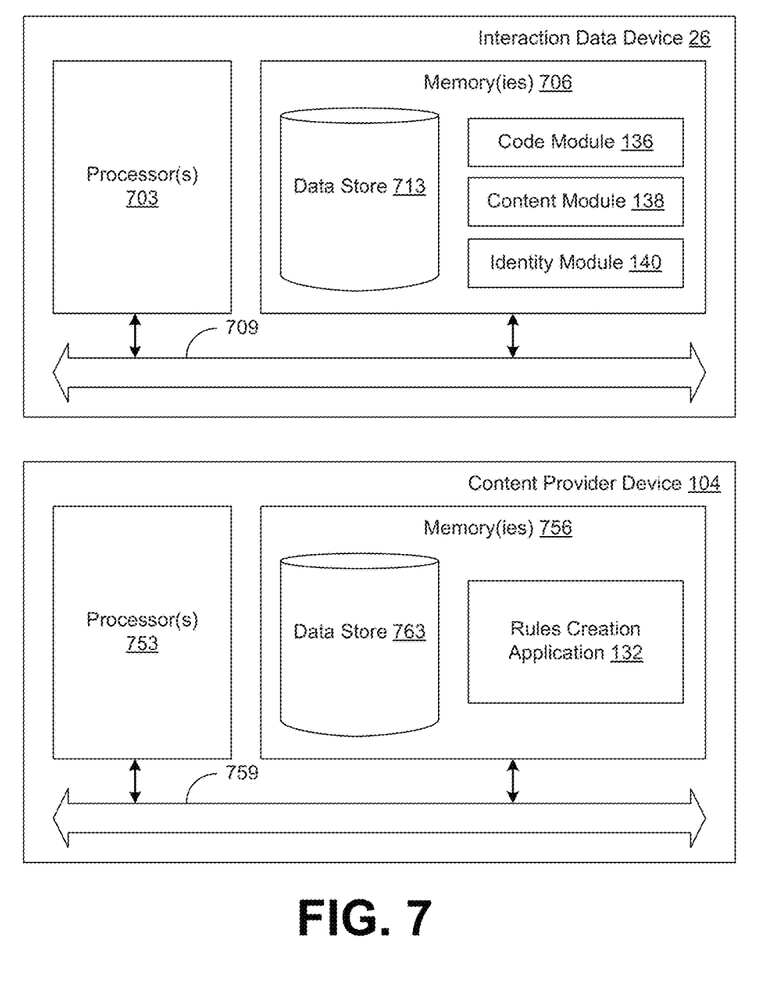
FIG. 7 is a schematic block diagram that provides one example illustration of a content provider device and interaction data device employed in the networked environment of FIG. 2 according to one embodiment of the present disclosure.

With reference to FIG. 7, shown is a schematic block diagram of the interaction data device 26 and content provider device 104 according to an embodiment of the present disclosure. The interaction data device 26 and content provider device 104 each include at least one processor circuit, for example, having a processor 703 and 753, and a memory 706 and 756, both of which are coupled to a local interface 709 and 759. To this end, the interaction data device 26 and content provider device 104 may comprise, for example, at least one server computer or like device. The local interface 709 and 759 may comprise, for example, a data bus with an accompanying address/control bus or other bus structure as can be appreciated.

Stored in the memory 706 and 756 are both data and several components that are executable by the processor 703 and 753, respectively. In particular, stored in the memory 706 and executable by, the processor 703 are the code module 136, the content module 138, the identity module 140, and potentially other applications. Stored in memory 756 and executable by processor 753 is the rules creation application 132 and potentially other applications. Also stored in the memory 706 and 756 may he a data store 713 and 763 and other data. In addition, an operating system may be stored in the memory 706 and 756 and executable by the processor 703 and 753, respectively.

It is understood that there may be other applications that are stored in the memory 706 and 756 and are executable by the processors 703 and 753, respectively, as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

The memory 706 and 756 is defined herein as including both volatile and nonvolatile memory and data storage components. Volatile components are those that do not retain data values upon loss of power. Nonvolatile components are those that retain data upon a loss of power. Thus, the memory 706 and 756 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 703 and 753 may represent multiple processors and the memory 706 and 756 may represent multiple memories that operate in parallel processing circuits. In such a case, the local interface 709 and 759 may be an appropriate network (FIG. 1) that facilitates communication between any two of the multiple processors 703 and 753, respectively, between any processor 703 and 753, respectively, and any of the memories 706 and 756, respectively, or between any two of the memories 706 and 756, respectively, etc. The local interface 709 and 759 may comprise additional systems designed to coordinate this communication, including, for example, performing load balancing. The processor 703 and 753 may be of electrical or of some other available construction.

Although the code module 136, content module 138, identity module 140, rules creation application 132, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the code module 136, content module 138, identity module 140, rules creation application 132, that comprises software or code can be embodied in any non-transitory computer-readable medium for use by or in connection with an instruction execution system such as, for example, a processor 703 and 753 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

While this specification contains many specifics, these should not be construed as limitations on the scope or of what may be claimed, but rather as descriptions of features specific to particular aspects. Certain features that are described in this specification in the context or separate aspects can also be implemented in combination in a single implementation. Conversely, various features that are described in the context of a single implementation can also be implemented in multiple ways separately or in any suitable subcombination. Moreover, although features may be described above as acting in certain combinations, one or more features from a combination can in some cases be excised from the combination, and the combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or device, or packaged into multiple software products or devices.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method comprising:
monitoring interactions of users with a content providing entity over two or more forms of communication and producing user entries associated with corresponding users including information pertaining to the monitored interactions, wherein the two or more forms of communication include an electronic form of communication and a non-electronic form of communication, wherein the two or more forms of communication include anonymous communications that are each maintained as a separate user entry, wherein the electronic form of communication comprises a communication using one or more selected from a group of a browser, an e-mail application, and a social media platform, wherein the non-electronic form of communication comprises one or more selected from a group of communication via delivery of a printed document and an in-person communication at a location associated with the content providing entity, and wherein prior interactions of a user include a first interaction using the browser to access a web page and anonymously conduct a transaction and a second interaction using the non-electronic form of communication;

resolving the separate user entries of the anonymous communications by parsing the separate user entries including the anonymous communications, extracting information from the separate user entries including the anonymous communications, comparing the information in the separate user entries including the anonymous communications with information pertaining to the monitored interactions in other user entries, and linking the separate user entries with the other user entries based on similarities between the compared information, the information in the separate user entries comprising information entered by the user to identify the monitored interactions with information associated with a same user and determine a user identity for the anonymous communications based on the information of the identified monitored interactions;

receiving a request for content from a user device associated with the user having an identifier;

executing a set of content identification rules to determine targeted content for the user based on the user's prior interactions with the content providing entity over the two or more forms of communication;

generating programming language code to modify the web page;

in response to determining the targeted content, executing the generated programming language code to modify the web page to include the targeted content, wherein the targeted content includes content comprising the anonymous transaction and the determined user identity; and providing the modified web page with the targeted content to the user device to be rendered on a display associated with the user device.

2. The method of claim 1, wherein the second interaction using the non-electronic form of communication comprises an in-person verbal communication between the user and the content providing entity, wherein information for the second interaction is separately maintained from information for the first interaction, and wherein executing a set of content identification rules further comprises:

executing the set of content identification rules to determine targeted content for the user based on the first and second interactions.

3. The method of claim 1, further comprising receiving information about the first interaction over a network.

4. The method of claim 3, further comprising associating the information about the first interaction with the information about the second interaction when the identifier is associated with both the information about the first interaction and the information about the second interaction.

5. The method of claim 1, wherein resolving the separate user entries further comprises:

determining whether the information about the anonymous communication of a separate user entry corresponds with information about an interaction of a user entry having a known user identifier; and in response to determining that the information about the anonymous communication of the separate user entry corresponds with the information about the interaction of the user entry having the known user identifier, associating the information about the anonymous communication of the separate user entry with the information about the interaction of the user entry having the known user identifier.

6. The method of claim 5, wherein determining whether the information about the anonymous communication of the separate user entry corresponds with the information about the interaction of the user entry having the known user identifier comprises comparing the information about the anonymous communication of the separate user entry with the information about the interaction of the user entry having the known user identifier to find similar information.

7. The method of claim 1, wherein one or more rules within the set of content identification rules is based on a frequency of interaction and a duration of interaction.

8. The method of claim 1, wherein information about the user's prior interactions with the content providing entity is stored.

9. A non-transitory computer-readable medium on which is encoded program code, the program code comprising:

program code for providing executable code that engages with a cookie associated with a browser on a user device, the executable code configured to engage the cookie to identify information about a user's interactions with a content providing entity;

program code for monitoring interactions of users with the content providing entity over two or more forms of communication and producing user entries associated with corresponding users including information pertaining to the monitored interactions, wherein the two or more forms of communication include an electronic form of communication and a non-electronic form of communication, wherein the two or more forms of communication include anonymous communications that are each maintained as a separate user entry, wherein the electronic form of communication comprises a communication using one or more selected from a group of a browser, an e-mail application, and a social media platform, wherein the non-electronic form of communication comprises one or more selected from a group of communication via delivery of a printed document and an in-person communication at a location associated with the content providing entity, and wherein prior interactions of a user include a first interaction using the browser to access a web page and anonymously conduct a transaction and a second interaction using the non-electronic form of communication;

program code for resolving the separate user entries of the anonymous communications by parsing the separate user entries including the anonymous communications, extracting information from the separate user entries including the anonymous communications, comparing the information in the separate user entries including the anonymous communications with information pertaining to the monitored interactions in other user entries, and linking the separate user entries with the other user entries based on similarities between the compared information, the information in the separate user entries comprising information entered by the user to identify the monitored interactions with information associated with a same user and determine a user identity for the anonymous communications based on the information of the identified monitored interactions;

program code for receiving the information about the user's interactions with the content providing entity;

program code for associating the information about the user's interactions over the two or more forms of communication together with an identifier;

program code for identifying targeted content for the user based on the information about the user's prior interactions over the two or more forms of communication with the content providing entity;

program code for generating programming language code to modify the web page;

program code for, in response to identifying the targeted content, executing the generated programming language code to modify the web page to include the targeted content, wherein the targeted content includes content comprising the anonymous transaction and the determined user identity;

program code for providing the modified web page with the targeted content to the user device to be rendered on a display associated with the user device.

10. The non-transitory computer-readable medium of claim 9, further comprising program code for executing a set of content identification rules received from the content providing entity to identify the targeted content for the user.

11. The non-transitory computer-readable medium of claim 10, wherein executing the set of content identification rules identifies the targeted content based on the information about the user's prior interactions with the content providing entity over the two or more forms of communication.

12. The non-transitory computer-readable medium of claim 9, wherein the second interaction using the non-electronic form of communication comprises an in-person verbal communication between the user and the content providing entity, wherein information for the second interaction is separately maintained from information for the first interaction, and wherein the program code for identifying targeted content for the user further comprises:
 program code for identifying targeted content for the user based on the information about the first and second interactions.

13. The non-transitory computer-readable medium of claim 9, wherein the program code for resolving the separate user entries further comprises:
 program code for determining whether the information about the anonymous communication of a separate user entry corresponds with information about an interaction of a user entry having a known user identifier; and
 program code for associating the information about the anonymous communication of the separate user entry with the information about the interaction of the user entry having the known user identifier in response to determining that the information about the anonymous communication of the separate user entry corresponds with the information about the interaction of the user entry having the known user identifier.

14. The non-transitory computer-readable medium of claim 10, wherein one or more rules within the set of content identification rules is based on a duration of interaction and a frequency of interaction.

15. The non-transitory computer-readable medium of claim 9, wherein the information about the first interaction is received over a network.

16. A system, comprising:
 a content provider device comprising a rules creation application for managing content identification rules and content, the rules creation application comprising:
  logic for associating a set of content identification rules to the content; and
  logic for publishing the set of content identification rules for identifying targeted content based on information about a user's prior interactions with a content providing entity associated with the content provider device through two or more forms of interaction; and
 an interaction data device comprising:
  a content module for identifying the targeted content to provide to a user device, the content module comprising:
   logic for receiving information about interactions of users with the content providing entity through two or more forms of communication, wherein the two or more forms of communication include an electronic form of communication and a non-electronic form of communication, wherein the received information includes user entries associated with corresponding users including information pertaining to monitored interactions, wherein the two or more forms of communication include anonymous communications that are each maintained as a separate user entry, wherein the electronic form of communication comprises a communication using one or more selected from a group of a browser, an e-mail application, and a social media platform, wherein the non-electronic form of communication comprises one or more selected from a group of communication via delivery of a printed document and an in-person communication at a location associated with a content providing entity, and wherein prior interactions of the user include a first interaction using the browser to access a web page and anonymously conduct a transaction and a second interaction using the non-electronic form of communication;
   logic for receiving the published set of content identification rules from the content provider device; and
   logic for executing the published set of content identification rules to identify the targeted content based on the information about the user's prior interactions with the content providing entity through the two or more forms of communication;
  an identity module to monitor the user's interactions with the content providing entity and resolve the separate user entries of the anonymous communications by parsing the separate user entries including the anonymous communications, extracting information from the separate user entries including the anonymous communications, comparing the information in the separate user entries including the anonymous communications with information pertaining to the monitored interactions in other user entries, and linking the separate user entries with the other user entries based on similarities between the compared information, the information in the separate user entries comprising information entered by the user to identify the monitored interactions with information associated with a same user and determine a user identity for the anonymous communications based on the information of the identified monitored interactions; and
  a code module comprising:
   logic for generating programming language code to modify the web page;
   logic for, in response to identifying the targeted content, executing the generated programming language code to modify the web page to include the targeted content, wherein the targeted content includes content comprising the anonymous transaction and the determined user identity; and
   logic for providing the modified web page with the targeted content to the user device to be rendered on a display associated with the user device.

17. The system of claim 16, wherein the code module further comprises logic for engaging with a cookie associated with the browser on the user device to identify information about a user's interaction.

18. The system of claim 16, wherein the identity module further comprises:
 logic for determining whether the information about the anonymous communication of a separate user entry corresponds with information about an interaction of a user entry having a known user identifier; and
 logic for associating the information about the anonymous communication of the separate user entry with the information about the interaction of the user entry having the known user identifier in response to determining that the information about the anonymous communication of the separate user entry corresponds with the information about the interaction of the user entry having the known user identifier.

19. The system of claim 16, wherein the second interaction using the non-electronic form of communication comprises an in-person verbal communication between the user and the content providing entity associated with the content provider device, wherein information for the second interaction is separately maintained from information for the first interaction, and wherein the logic for executing the published set of content identification rules to identify the targeted content further comprises:

logic for executing the published set of content identification rules to identify the targeted content based on the information about the first and second interactions.

\* \* \* \* \*